April 8, 1947.　　　　　H. D. KADZ　　　　　2,418,554
CARRYING SCRAPER
Filed Feb. 14, 1944　　　　　6 Sheets—Sheet 6

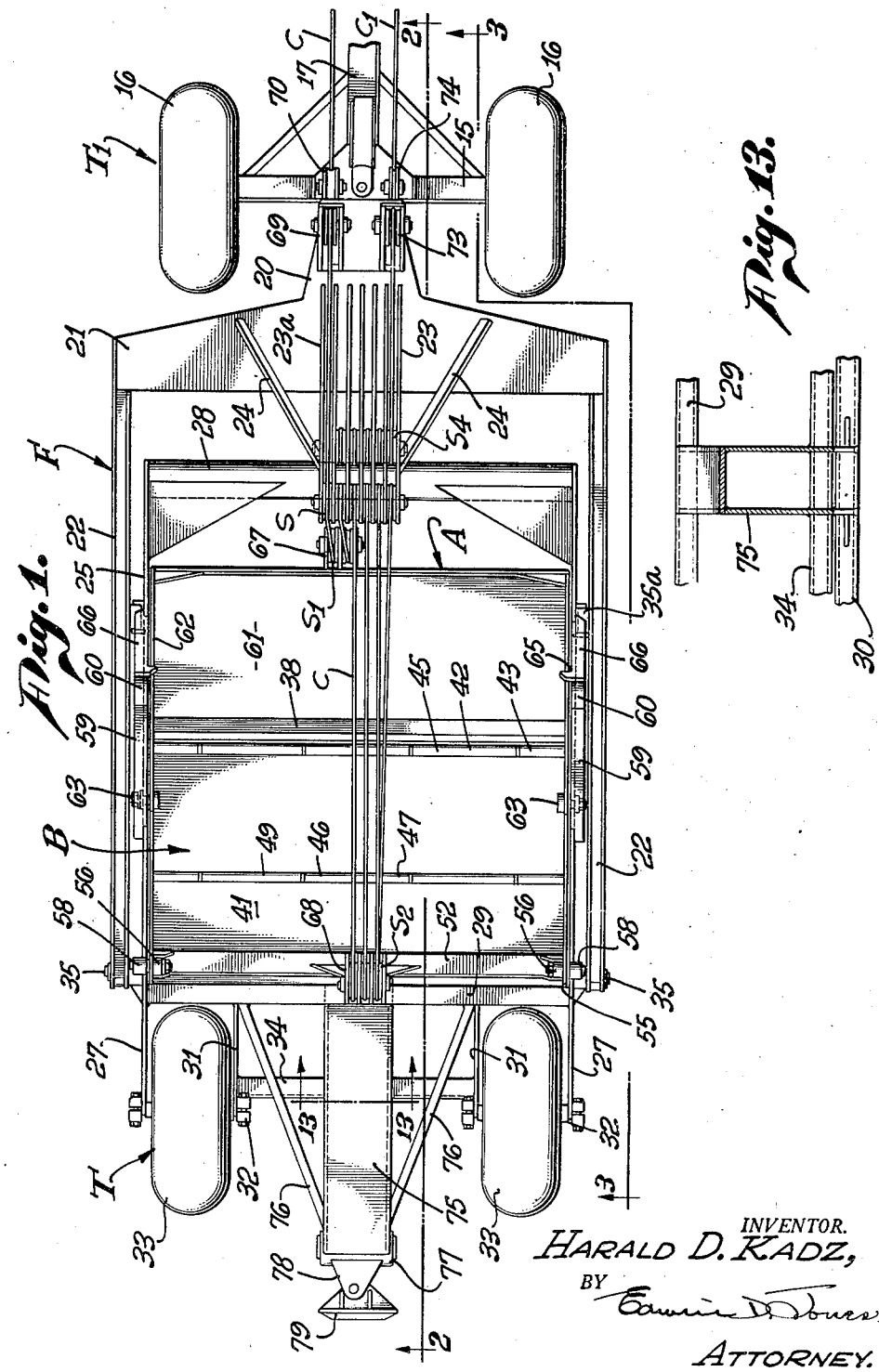

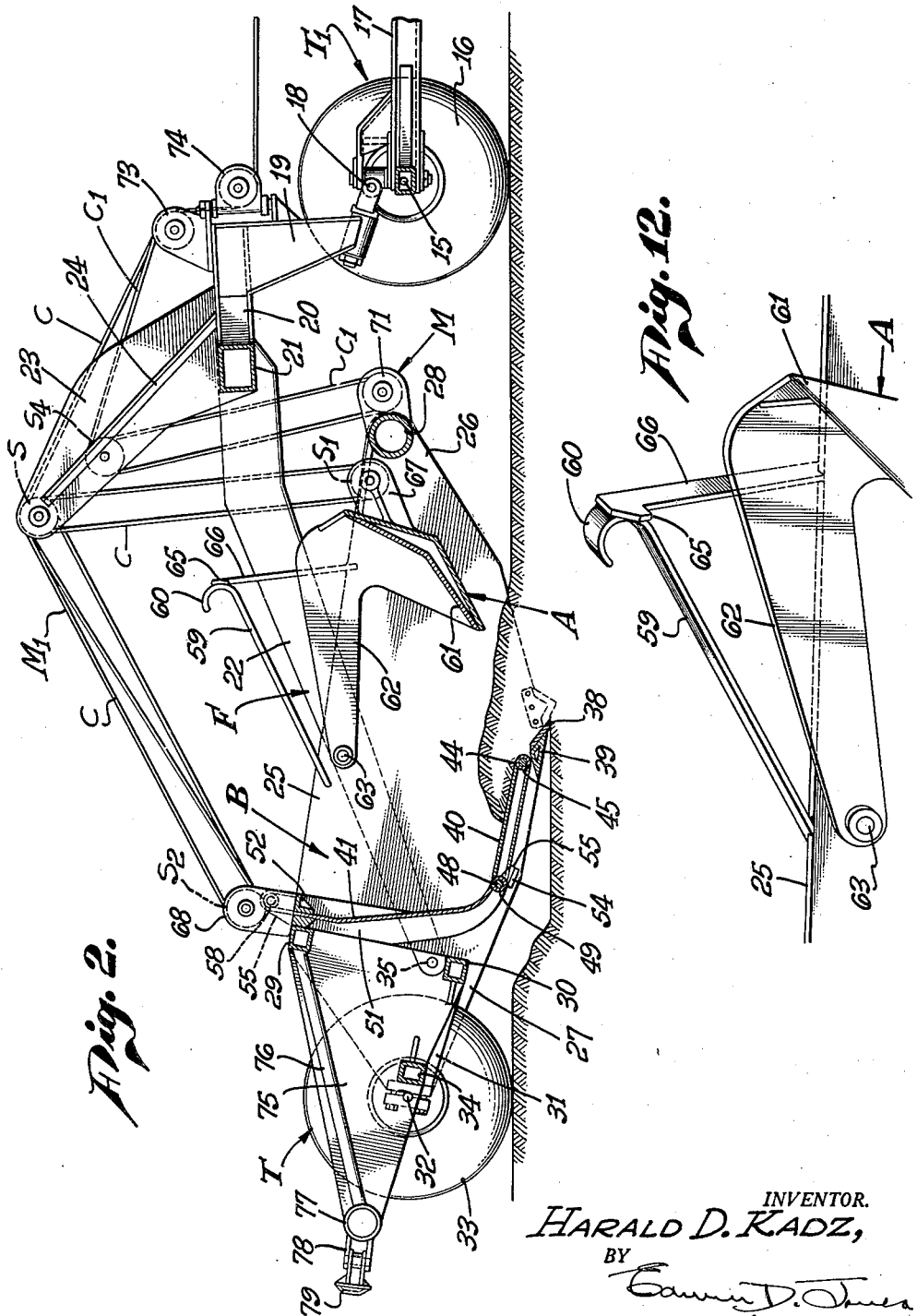

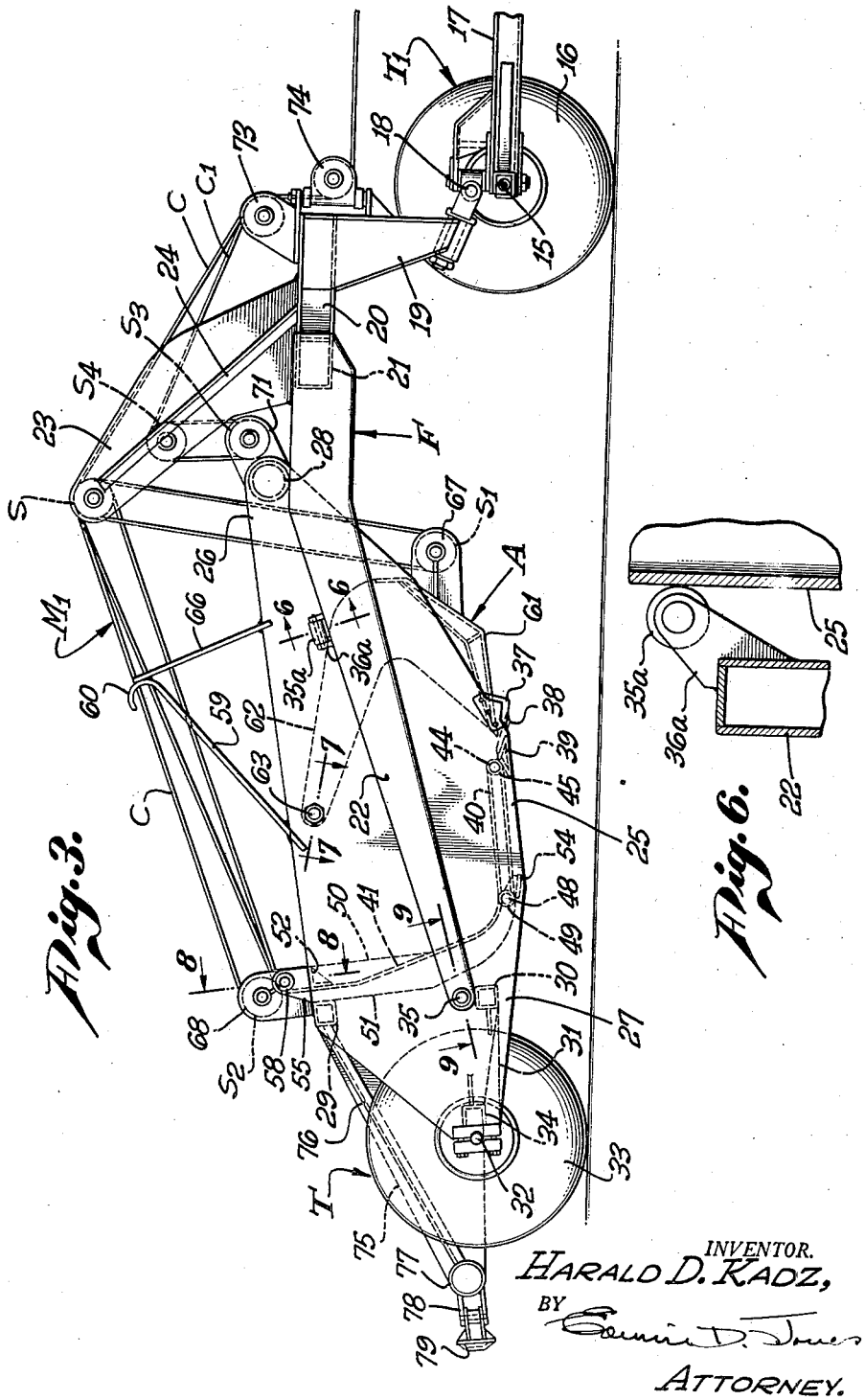

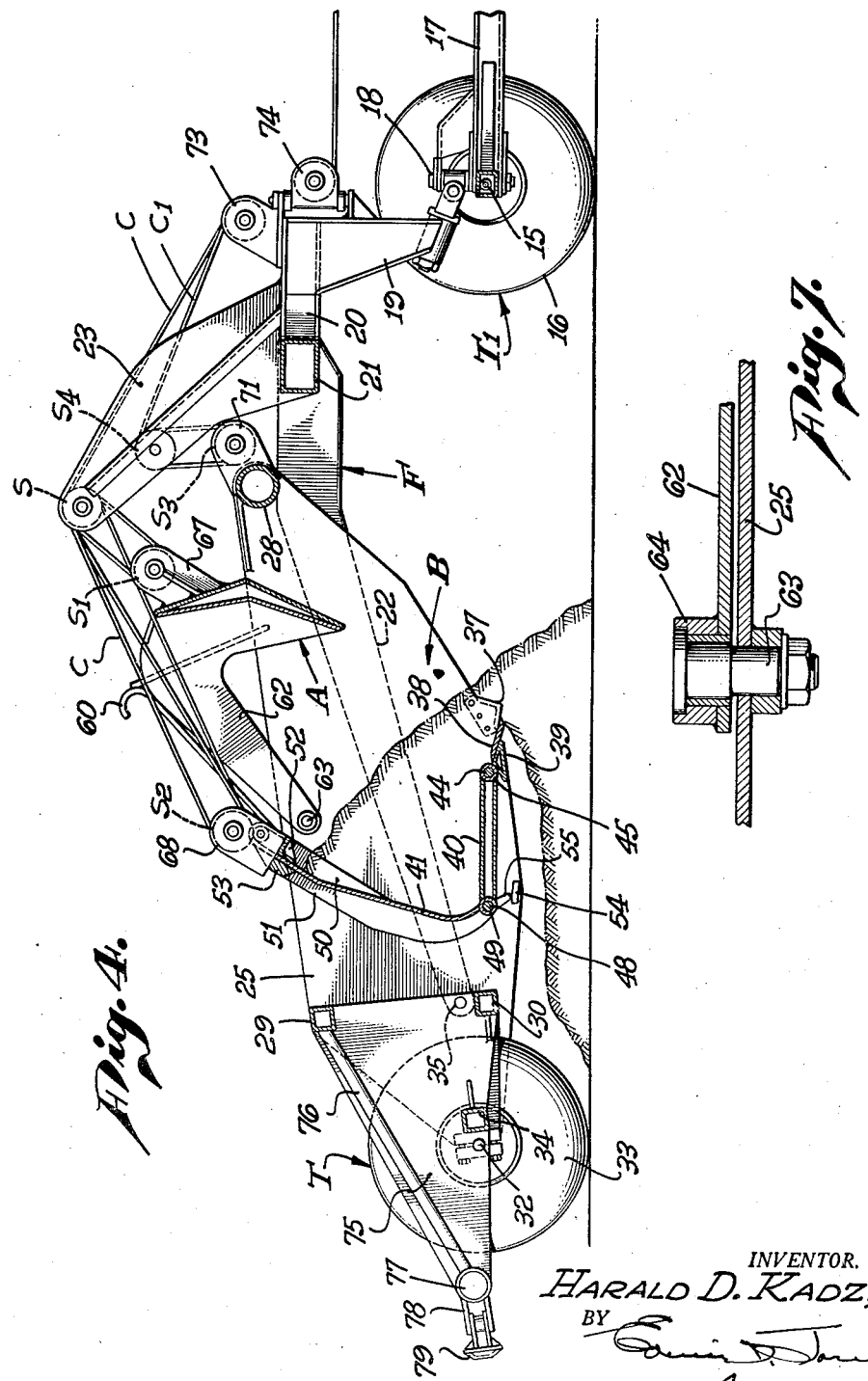

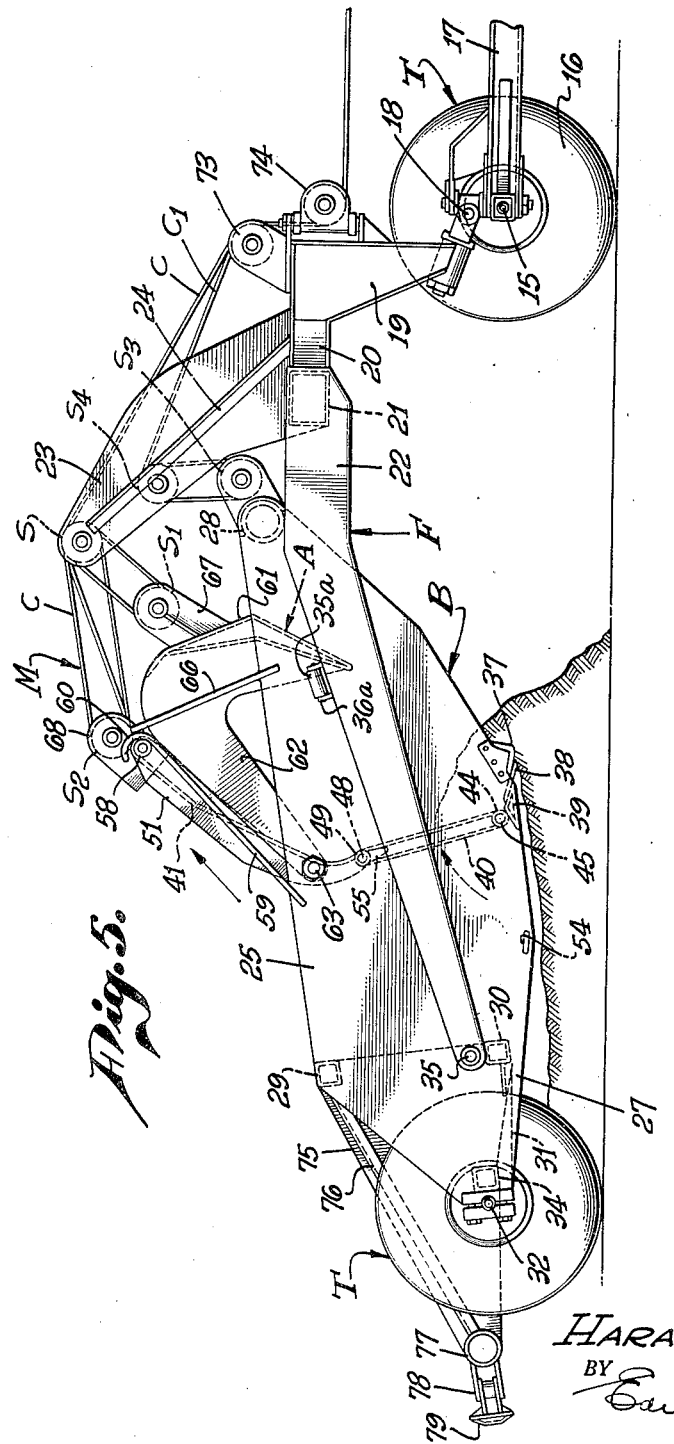

Apron and Bowl Cable Diagram

Diagram for Raising and Lowering Frame

INVENTOR.
HARALD D. KADZ,
BY
ATTORNEY.

Patented Apr. 8, 1947

2,418,554

UNITED STATES PATENT OFFICE 2,418,554

CARRYING SCRAPER

Harald D. Kadz, Glendale, Calif., assignor to Kay-Brunner Steel Products, Inc., a corporation of Delaware Application February 14, 1944, Serial No. 522,235

4 Claims. (Cl. 37—126)

My invention relates to carrying scrapers of the large capacity type in which is embodied a scraping bowl and an apron that provides a bowl supplemental to the scraping bowl to be loaded in conjunction therewith, and dumped at that end confronting the dumping end of the scraping bowl.

Such carrying scrapers as previously designed do not completely dump earth from the bowl or the apron, particularly when the earth is wet and sticky. Thus, after an initial complete loading only a partial dumping and, hence, only partial subsequent loadings and dumpings can be effected, so that the carrying capacity of the scraper is materially reduced. Also, in previous carrying scrapers, whether the bowl is tilted bodily to effect dumping or the rear endgate of the bowl is pulled forwardly to effect dumping, tremendous power is required, and when employing cables the pulling force necessary to actuate the bowl or its endgate is such as to frequently break the cables.

It is a purpose of my invention to provide a carrying scraper having a bowl characterized by interconnected and relatively movable parts actuatable to subject the mass of earth in the bowl to a disintegrating movement incident to the dumping operation, so as to thoroughly loosen and thus dislodge the earth from the walls of the bowl and thus when the movable parts reach their final dumping position, all earth will be discharged from the bowl. When dumping wet and sticky earth, the actuating means for the movable bowl parts is such that the parts can be jarred to effectively loosen any earth which may adhere to such parts, and thus effect complete dumping of the bowl. By dumping the bowl through actuation of its movable parts, less power is required than when tilting the bowl as a whole, or when employing a forwardly movable endgate, and a more complete discharge of earth is attained than is possible in the aforesaid methods because of the earth disintegration incident to the dumping operation.

Another purpose of my invention is the provision in a carrying scraper of an apron, the dumping position of which is such that it is inverted to effect complete dumping when filled with substantially dry earth, and which is actuated so that it can be brought into engagement with abutments and thus jarred to loosen and dump sticky earth which might ordinarily adhere thereto.

I will describe only one form of carrying scraper embodying my invention, and will then point out the novel features thereof in claims.

In the accompanying drawings:

Fig. 1 is a view showing in top plan one form of carrying scraper embodying my invention.

Fig. 2 is a vertical, longitudinal, sectional view taken on the line 2—2 of Fig. 1, and showing the scraper in digging position.

Fig. 3 is a vertical sectional view taken on the line 3—3 of Fig. 1, and showing the scraper in carrying position.

Fig. 4 is a view similar to Fig. 2 and showing the movable parts of the bowl in partly dumping position, and the apron in completely elevated position for dumping.

Fig. 5 is a view similar to Fig. 3 but showing the movable parts of the bowl in complete dumping position.

Fig. 6 is an enlarged sectional view taken on the line 6—6 of Fig. 3.

Fig. 7 is an enlarged sectional view taken on the line 7—7 of Fig. 3.

Fig. 12 is an enlarged fragmentary perspective view of one of the means for defining the dumping positions of the bowl and apron.

Fig. 13 is a vertical sectional view taken on the line 13—13 of Fig. 1.

Similar reference characters refer to similar parts in each of the several views.

Figure 10:
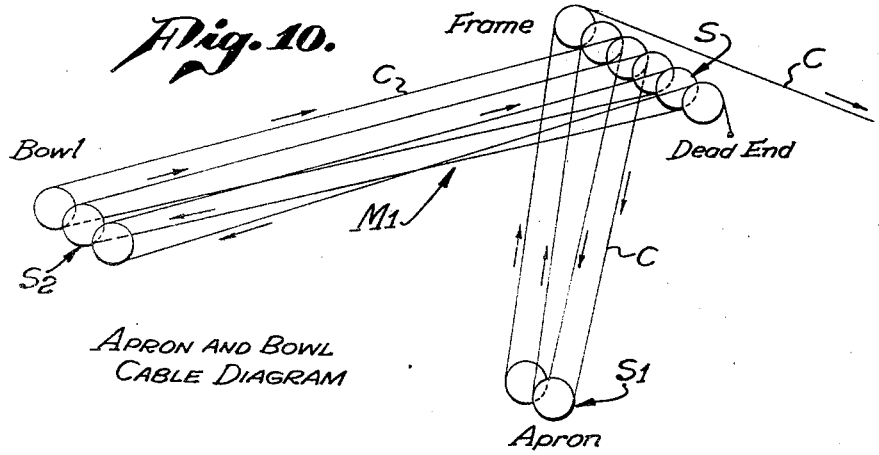
Fig. 10 is a diagrammatic view of the cable and pulley mechanism for actuating the apron and bowl.

With specific reference to the drawings, my carrying scraper, in its present embodiment, comprises a bowl B pivoted at its rear end on a rear wheel truck T to occupy digging and carrying positions; a frame F pivoted to the bowl and supported at its front by a front wheel truck T1; an apron A pivoted on the bowl to close the front end thereof, to partially open the latter, and to effect dumping of the apron; and two mechanisms M and M1, one for lifting the bowl from digging to carrying position, and the other for actuating the movable parts of the bowl necessary to effect dumping thereof, and lifting the apron to dumping position in advance of the actuation of the movable bowl parts.

The front truck T1 comprises an axle 15 carrying two rubber tired wheels 16, and a forwardly extending tongue 17 adapted for connection to the rear of the tractor by which the carrying scraper as a whole is adapted to be advanced. Through a conventional swivel connection 18 a leg 19 of the frame F is connected to the front truck so as to render the vehicle dirigible. This leg 19 depends from the forward end of a medial extension 20 of the transverse beam 21 of the frame F, and the ends of this beam have integral and rearwardly and downwardly inclined side beams 22.

Fixed to and rising from the transverse beam 21 are two sets of rearwardly inclined and parallel spaced plates which provide supporting brackets 23 and 23a for certain sheaves of the mechanisms M and M1, as will be later described herein. The bracket 23 is braced by bars 24 connected thereto and to the transverse beam 21 as shown in Figs. 1 and 3.

The bowl B is arranged between the side beams 22, and it includes a pair of sides 25 having tapered front ends 26, and tapered rear ends 27. The front ends 26 are rigidly connected to each other by a transverse tubular beam 28, while the rear ends 27 at their forward portions are rigidly connected by an upper tubular beam 29, and a lower tubular beam 30. Secured to these beams 29 and 30 between the ends 27 are triangular plates 31 which coact with the ends 27 to form mountings for axles 32 for the wheels 33 of the rear truck T. The plates 31 are reinforced by a transverse brace bar 34 which may be of tubular form.

Figure 9:
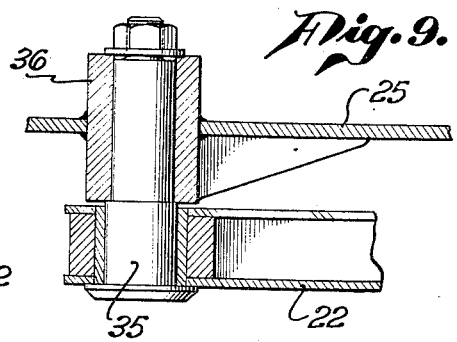
Fig. 9 is an enlarged section taken on the line 9—9 of Fig. 3.

The structure just described provides a pivotal mounting for the rear end of the bowl B by which the latter can swing upwardly and downwardly about the rear axles 32 as a center. The rear ends of the side frame beams 22 are pivoted by pins 35 (Fig. 9) mounted in sleeves 36 secured in the bowl sides 25 adjacent the lower edges thereof, and thus the bowl is vertically movable in relation to the frame F to permit its movement from digging to carrying position. To center the bowl in its vertical movements between the side beams 22 nonfriction rollers 35a are mounted in ears 36a, so as to bear against the outer surfaces of the bowl sides, as best shown in Fig. 6.

Depending V-shaped elements 37 may be bolted to the outer sides of the bowl sides 25 to have engagement with the ground when the bowl is in digging position and thus stabilize the bowl transversely. Between the bowl sides immediately to the rear of the elements 37, is a scraping blade 38 secured to a triangular support 39 which extends across the bowl sides and has its ends suitably secured to the latter.

To carry earth within the bowl B and to effect complete dumping of the earth from the bowl when desired, a plurality of members are mounted between the sides 25 to occupy a retracted or carrying position at the rear of the bowl and an advanced or dumping position at the front of the bowl. In the present instance, there are two such members 40 and 41, the member 40 constituting the bottom of the bowl, and the member 41 forming the back of the bowl. The bottom 40 is constructed of superposed plates having their forward edges constructed to provide a plurality of sleeves 42 alternately interposed between similar sleeves 43 fixed to the support 39. Through both sets of sleeves 42 and 43 a pintle 44 extends to provide a hinged connection 45 between the forward edge of the bottom 40 and the support 39. The rear edge of the bottom 40 is likewise constructed to provide a plurality of aligned sleeves 46, arranged alternately with respect to sleeves 47 on the lower forward edge of the back 41. Through these two sets of sleeves a pintle 48 extends to provide a hinge connection 49 between the bottom 40 and the back 41 by which the latter is mounted for pivotal movements on the bottom.

The back 41 is reinforced by a medial vertical web 50 at the front side thereof, while at its opposite vertical edges flanges 51 are secured to and extend rearwardly from the back. Strengthening angle bars 52 extend from opposite sides of the web 50 to the vertical edges of the back, while opposite the bars at the rear side of the back is a solid bar 53. This bar 53 abuts the upper beam 29 when the back is in retracted or carrying position, and thus such bar 53 defines the aforesaid position. The retracted or carrying position of the bottom 40 is defined by a cross bar 54 which is secured at its ends to the confronting faces of the bowl sides 25.

Cam lugs 55 are fixed to certain of the sleeves 47 to lie edgewise on the bar 54 when the back 41 is in retracted position, and being to the opposite side of the pintle 48 from that of the back, they serve to swing the back back to retracted position through engagement with the cross bar 54, as will be more fully described hereinafter.

Figure 8:
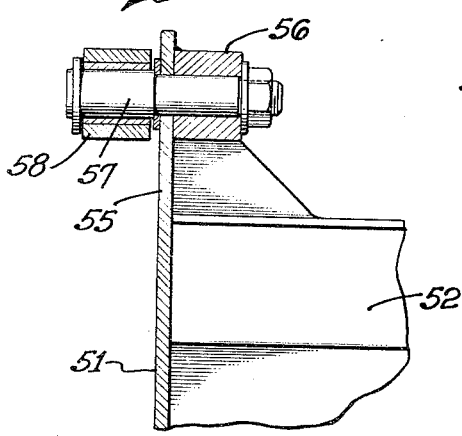
Fig. 8 is an enlarged vertical section taken on the line 8—8 of Fig. 3.

At the two upper corners of the back 41 rise ears 55, and to each ear (Fig. 8) is secured a sleeve 56. Through the ear and sleeve extend a pin 57 on the outer end of which is journalled a roller 58. Under forward movement of the back 41 and to what may be termed an intermediate position (Fig. 4) the rollers 58 are moved into contact with a pair of upwardly inclined guides or rails 59 secured to the upper edges of the bowl sides 25. Upon further forward movement of the back 41, the rollers 58 ride upwardly of the rails, and finally into engagement with abutments or stops 60 (Fig. 12) curved to receive the rollers and which define the extreme advanced or dumping position of the bowl back.

The apron A is positioned between the bowl sides 25 and at the front of bowl, and it comprises an earth receiving body 61 and rearwardly extending arms 62 fixed to the ends of the body and pivoted at their rear ends to the bowl sides by pins 63 on which hubs 64 (Fig. 7) carried by the arms are rotatably mounted. This pivotal mounting of the apron A is such that it can be lifted from a closed position at the front of bowl (Fig. 3) to an open position in which it is above and in advance of the bowl proper, and wherein the apron body is inverted (Fig. 4) for complete dumping. The dumping position of the apron is defined by a pair of abutments or stops 65 (Fig. 12) secured to the abutments 60 and formed on the upper ends of flat rods 66 secured at their lower ends to the bowl sides 25. The association of the rods with the rails 59 is such that the two serve to brace each other, and thus they are supported with the necessary rigidity to properly and permanently perform the functions for which they are intended.

The mechanism M1 for operating the bowl back 41 and lifting the apron A, may comprise a single cable C and three groups of sheaves S, S1, and S2, supported respectively, in brackets 23, 67, and 68. As previously described the bracket 23 is fixed on the frame beam 21, while the brackets 68 and 67 are fixed respectively, centrally on the top of the bowl back 41, and centrally on the front side of the apron body 61.

The cable C is anchored at one end to the bracket 23 and thence to and back and forth between the different sheaves of the groups S, S2 and S1 in the manner illustrated diagrammatically in Fig. 10, and finally forwardly from one of the sheaves of group S about directional changing pulleys 69 and 70 at the front of the frame F, whence it is extended forwardly for connection to the winch of a tractor (not shown). By this arrangement it will be clear from a consideration of Fig. 10, that a pull on the forward end of the cable first decreases the distance between the sheave group S and S1 to lift the apron A, and then decreases the distance between sheave groups S and S2 to pull the bowl back 41 forwardly from its retracted or carrying position. This sequential operation of the apron and the bowl back is necessary in order that the apron be clear of the front end of the bowl before the bowl back is advanced so as to prevent the apron from obstructing the initial dumping of earth from the bowl by the back.

The mechanism M for operating the bowl B to lift it from digging position to carrying position, likewise may be of the cable and sheave type. It comprises a cable C1 anchored at one end to the frame F (Fig. 11) and then trained back and forth about the sheaves of two groups S3 and S4. The sheaves S3 are mounted in a bracket 71 secured centrally to the tubular cross beam 28, while the sheaves S4 are mounted on the bracket 23a. From the sheaves S4 the cable C1 passes forwardly and downwardly over direction changing pulley 73 and 74 for connection to the winch of the tractor.

Figure 11:
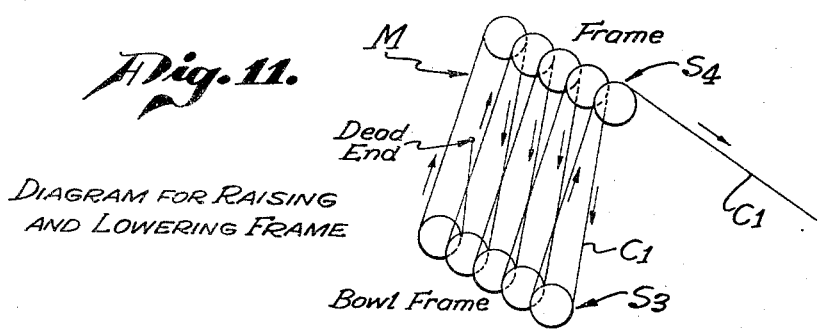
Fig. 11 is a diagrammatic view of the cable and pulley mechanism for lifting the bowl.

By a pull on the cable C1 in the direction of the arrow in Fig. 11, the sheave group S3 is lifted to in turn lift the front end of the bowl thereby causing the bowl to swing upwardly about the axles 32 as a center from the digging position shown in Fig. 2 to the carrying position shown in Fig. 3. During this movement of the bowl, the side arms 62 are also lifted pivoting about the pins 35, while the frame F as a whole swings upwardly to a limited extent about the swivel connection 18 as a center.

In operation, the scraper is loaded by lowering the bowl B through operation of the cable C1, so that the blade 38 is at the desired scraping or digging level, while the apron through operation of the cable C, is elevated until it is above and in front of the blade 38 a suitable distance according to the character of the earth being scraped, all as illustrated in Fig. 2. Under forward movement of the scraper earth passes into the bowl until it assumes a relatively steep angle at the front, when it begins to fall forwardly to fill the apron.

When the scraper is fully loaded the bowl is raised to a carrying position by manipulation of the cable C1, and so that the blade 38 engages the adjacent rear edge of the apron body 61, as shown in Fig. 3.

To dump the load the cable C is pulled to first lift the apron to its topmost position, wherein the arms 62 engage the abutments 65. In this position of the apron (Fig. 4) the front of the bowl is fully opened, and the body 61 is inverted to cause a free flow of earth from the apron. Upon the apron reaching this inverted position, continued pull on the cable C, swings the bowl back 41 forwardly about the hinge 49 from the retracted or carrying position to an intermediate advanced position, and under such movement of the back the cam lugs 55 are swung downwardly against the bar 54 to initiate elevating movement of the bowl bottom 40, all as illustrated in Fig. 4.

With continued pull on the cable C the back 41 is further advanced in the bowl, and at the same time lifted by the rollers 58 which now ride up the rails 59 and into engagement with the abutments 60, the back finally assuming a forwardly inclined dumping position above and at the front of the bowl, as shown in Fig. 5. Under this advancing and elevating movement of the back 41 to dumping position the bottom 40 is swung upwardly and forwardly about its hinge 45 to substantially a vertical dumping position at the front of the bowl as also shown in Fig. 5.

By virtue of the aforedescribed movements of the bottom 40 and the back 41, all earth is discharged from the bowl, the movement of the back from carrying position to the intermediate advanced position (Fig. 4) operating to push the earth mass forwardly and at the same time distintegrate or break up the mass by reason of movement of the back downwardly toward the bottom 40 so that the earth begins to flow freely from the front of the bowl. Under the succeeding elevating movement of both the back and the bottom, this disintegrating action is continued so that when reaching their final dumping positions the bottom and back have completely discharged all earth from the bowl. It is by virtue of the pivotal mounting of both the back and the bottom of the bowl, the resultant paths of movement which they describe, and the coincident earth disintegration that comparatively little power is necessary for actuation of the cable C to effect complete dumping of the bowl. In consequence, the possibility of cable breakage is correspondingly reduced.

Where a single large power driven tractor is not available to pull my large capacity carrying scraper, two smaller tractors may be employed, one at the front end of the scraper for pulling, and the other at the rear end for pushing.

In order that the rear tractor may effectively push the scraper, and without damage thereto a beam 75 is arranged centrally at the rear of the bowl B and braced by a pair of divergent rods 76. The rods 76 are inclined and their upper forward ends are secured to the upper cross beam 29 (Figs. 1 and 3), while their lower rear ends are secured to opposite sides of the beam 75. The beam as shown in Fig. 13, is of inverted U-form in cross section, and, as shown in Fig. 2, has sides substantially of triangular form and secured to the cross beams 29, 30, and 34.

To the rear end of the beam 75 and transversely thereof, is secured a bracket 77 having ears 78 in which a pusher head 79 is vertically pivoted. It is against the head 79 that the front end of the rear tractor is adapted to abut for pushing the scraper to assist the front tractor in moving my large capacity scraper. By virtue of the described beam and rod construction the pushing force of the rear tractor is applied centrally of the rear of the scraper, and without setting up forces damaging to the scraper.

Although I have herein shown and described only one form of carrying scraper embodying my invention, it is to be understood that various changes and modifications may be made therein without departing from the spirit of my invention and the spirit and scope of the appended claims.

I claim:

1. A carrying scraper, comprising: a bowl having a bottom hinged between the bowl sides to swing forwardly and upwardly in the bowl, and a back hinged to said bottom to swing forwardly in the bowl; means for pulling said back forwardly; members coacting with said means for lifting said back as it is moved forwardly to in turn swing said bottom upwardly and forwardly; and elements associated with said members for limiting forward and upward movements of said back and against which said back may strike to jar earth loose from the latter and the bottom.

2. In a carrying scraper: a bowl having relatively fixed sides, a bottom hingedly connected to said sides, and a back hingedly connected to said bottom; means for swinging said back forwardly about its hinged connection with said bottom; rollers on said back; rails fixed to and rising from said sides which, under forward movement of said back, are engaged by said rollers to lift said back and in turn swing said bottom upwardly and forwardly; and abutments on said rails engageable by said rollers for limiting upward and forward movements of said back and to jar said back so as to loosen earth from the latter.

3. In a carrying scraper: a bowl having relatively fixed sides, a bottom hingedly connected to said sides, and a back hingedly connected to said bottom; means for swinging said back forwardly about its hinged connection with said bottom; rollers on said back; rails fixed to and rising from said sides which, under forward movement of said back, are engaged by said rollers to lift said back and in turn swing said bottom upwardly and forwardly; abutments on said rails engageable by said rollers for limiting upward and forward movements of said back and to jar said back so as to loosen earth from the latter; an apron; means pivoting said apron for upward swinging movement between said bowl sides; elements rising from said bowl sides and fixed to the latter and to said rails; and abutments fixed to said elements and positioned to limit upward swinging movement of said apron.

4. A carrying scraper, comprising: a bowl having a bottom hinged between the bowl sides to swing forwardly and upwardly in the bowl, and a back hinged to said bottom to swing forwardly from a rear position in the bowl; means for pulling said back from a rear position forwardly and upwardly past a dead center position; members coacting with said means for lifting said back as it is moved forwardly to in turn swing said bottom upwardly; and means on and between said bowl sides and means on said back adjacent the hinge connection thereof with said bottom, coacting to swing said back rearwardly past the dead center position under descending movement of said back to insure return of said back to its rear position.

HARALD D. KADZ.

REFERENCES CITED

The following references are of record in the file of this patent:

UNITED STATES PATENTS

| Number | Name | Date |
|---|---|---|
| 2,220,472 | Brodersen | Nov. 5, 1940 |
| 2,229,241 | French | Jan. 21, 1941 |
| 2,278,036 | Bird | Mar. 31, 1942 |
| 2,347,291 | Shaeffer | Apr. 25, 1944 |